United States Patent [19]
Molthen

[11] Patent Number: 5,159,780
[45] Date of Patent: Nov. 3, 1992

[54] PLANT SUPPORT STAND

[76] Inventor: Robert M. Molthen, 3531 Tallpine Way 432 C-2, Greenacres, Fla.

[21] Appl. No.: 537,122

[22] Filed: Jun. 13, 1990

[51] Int. Cl.⁵ ............................................. A01G 9/12
[52] U.S. Cl. ................................................ 47/70; 47/43; 47/45; 248/523
[58] Field of Search .................... 47/40.5, 42, 44, 70; 248/530, 523, 534, 519

[56] References Cited

U.S. PATENT DOCUMENTS

| | | | |
|---|---|---|---|
| 912,412 | 2/1909 | Hart | 47/70 |
| 1,916,305 | 11/1933 | Esselen | 47/70 |
| 2,501,255 | 3/1950 | Bell | 47/42 |
| 3,026,649 | 1/1962 | Barakauskas | 47/70 |
| 3,354,580 | 3/1967 | Amortegui | 47/70 |
| 4,040,208 | 10/1977 | England | 47/70 |
| 4,074,461 | 6/1978 | Hirschman | 47/70 |
| 4,096,662 | 5/1978 | Anderson | 47/70 |
| 4,128,965 | 4/1978 | D'Hondt | 47/47 |
| 4,170,088 | 3/1979 | Fritz | 47/70 |
| 4,270,310 | 1/1981 | Fischer | 47/70 |
| 4,509,289 | 2/1985 | Fogelson | 47/70 |
| 4,584,792 | 9/1986 | Etzel | 47/70 |
| 4,631,861 | 8/1986 | Wuthrich | 47/70 |
| 4,699,347 | 10/1987 | Kahnley | 47/42 |
| 4,839,987 | 7/1989 | Cosandier | 47/70 |
| 4,872,283 | 12/1989 | Yinger | 47/70 |

FOREIGN PATENT DOCUMENTS

| | | | |
|---|---|---|---|
| 40644 | 1/1910 | Austria | 47/42 |
| 2524256 | 10/1983 | France | 47/70 |
| 501127 | 11/1954 | Italy | 47/42 |
| 18587 | 8/1904 | United Kingdom | 47/42 |

Primary Examiner—Henry E. Raduazo

[57] ABSTRACT

A method to hold a potted or planted plant or rooted tree in a vertical upright position, comprising a flexible circular collar (22) joined to a plurality of two piece adjustable elongated support members (26). Further, having the means for the plurality of two piece adjustable elongated support members (26) to be placed upon the upper lip of a pot by means of the plurality of forked elongated support member holders (38) or secured directly into the soil by means of the plurality of the shovel head elongated support member (40).

3 Claims, 2 Drawing Sheets

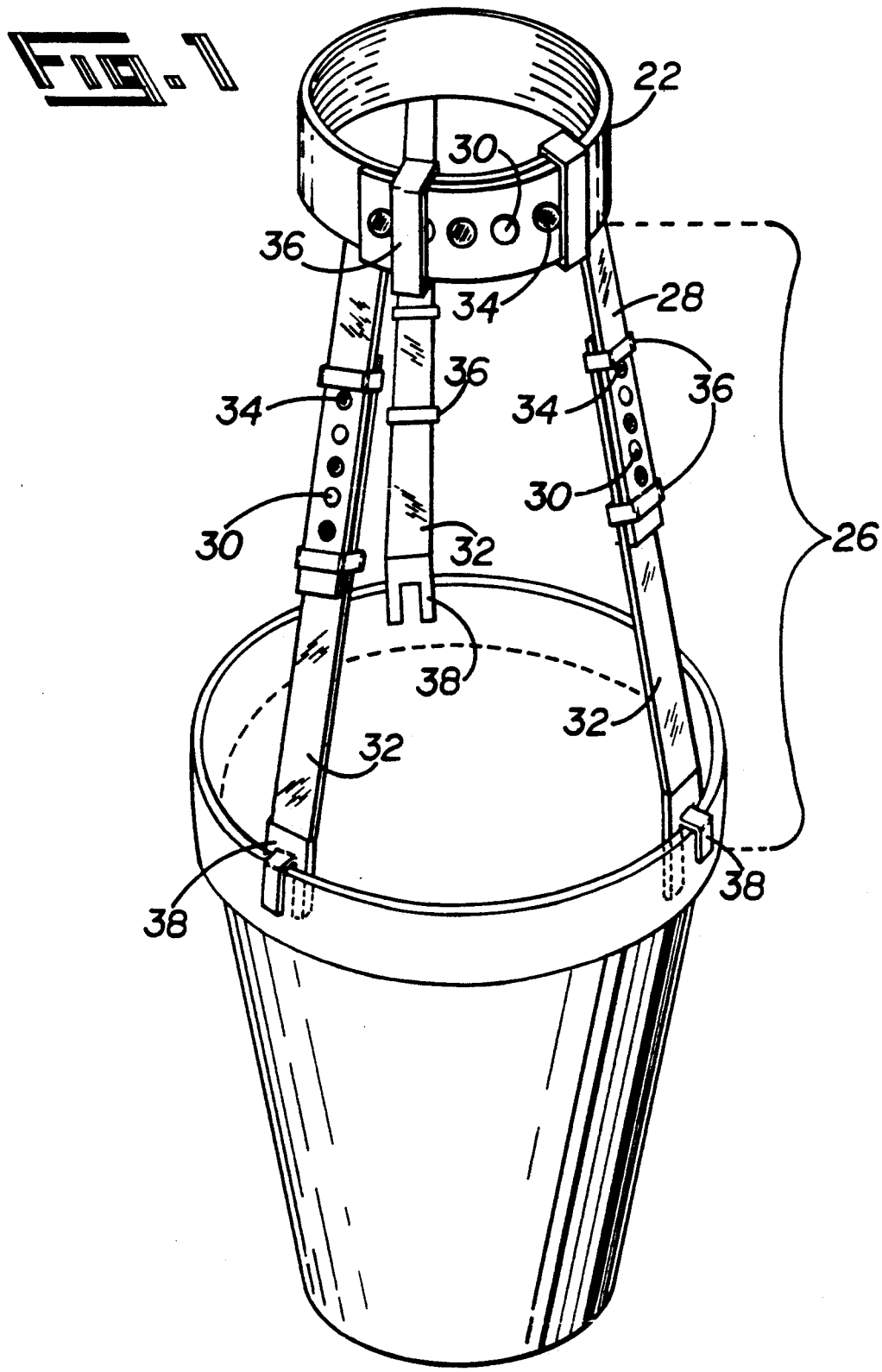

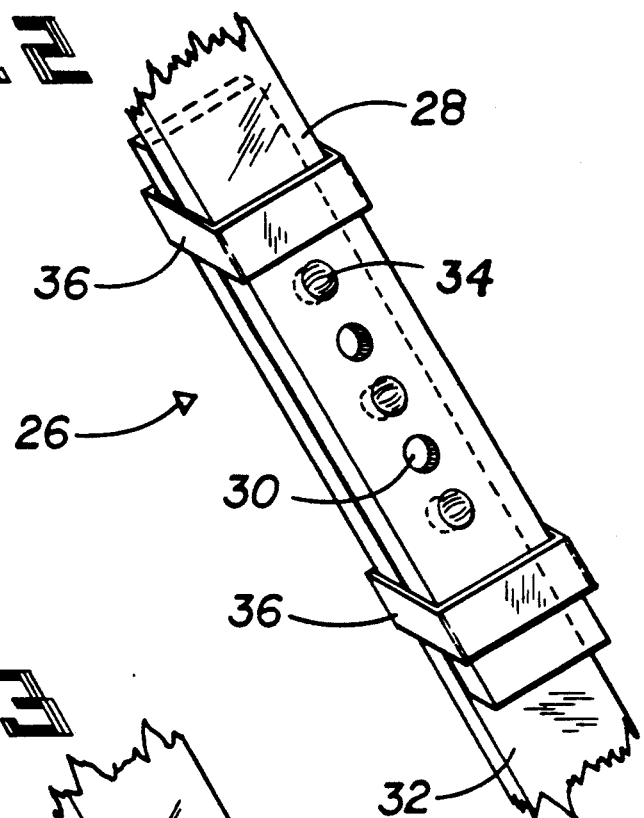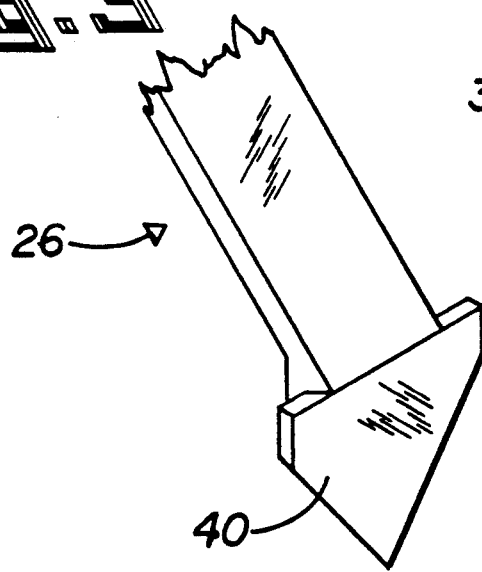

PLANT SUPPORT STAND

FIELD OF INVENTION

The present invention relates to a method of maintaining a potted or planted plant or tree in a vertical position while the plant or tree is in the early growth stages; or sustaining a plant or tree in a vertical position after reaching maturity when the root system cannot hold or support the plant or tree in a vertical fashion.

BACKGROUND

A vast majority of households contain a wide variety of potted plants within the house as well as plants utilized as decorative shrubbery on the exterior of the homes. At various times, these plants grow beyond the bounds of containment, outgrow the pot, or simply require an external source to hold them erect. Due to the overgrown size, either the root system or soil cannot maintain the potted or planted plant or tree in a vertical position. As a result they become subject to leaning or outright falling over. As a result of the size that the plants or trees achieve, the acceptable method in holding these plants in an upright vertical position has been to place a vertical piece of material (usually a wooden dowel or wide piece of wood) within the potted plant or adjacent to a plant growing on the outside of the home. The usual method is to tie the plant to the wood with string, ribbon or other cloth material. Usually the string, ribbon or cloth dry rots, cuts the plants vertical stem or no longer can hold the plant. The plant then falls over again, resulting in replacement of the wood by a larger size, or a new piece of string, ribbon or cloth material.

With larger trees, the current practice is to place a configuration of wooden boards directly on the trunk of the tree, an indeterminate distance above the soil. Joined to the boards surrounding the tree trunk, a series of longer boards are placed, usually at approximately a forty-five degree angle. Wooden stakes are then driven into the ground an indeterminate distance outward from the base of the tree trunk, wherein the longer boards are joined to the wooden stakes as a means of support to maintain the tree in a vertical manner.

At best, the measures are temporary and unsightly. In addition, they provide an inadaquate support system for the potted or planted plant or tree. Since the problem causing the plant or tree to lean is the size of the plant or tree or the texture of the soil, the placement of a section of wood adjacent to the plant and within the same textured soil can hardly solve the problem. Therefore, it stands to reason that alternative support methods must be found and utilized.

OBJECTS AND ADVANTAGES

Accordingly, besides the objects and advantages of the Plant Support Stand described in my patent, several objects and advantages of the present invention are:

A) To provide a permanent plant stand that is adjustable to the particular plant's needs.
B) To provide a Plant Support Stand that adjusts to the size of the plant when first installed and to further provide a plant stand that can be utilized and expanded as the plant grows.
C) To provide a color-specific Plant Support Stand that blends in with the natural color of the plant or pot.
D) To provide a Plant Support Stand that is economical to purchase.
E) To provide a Plant Support Stand that will not damage the plant or tree.
F) To provide a Plant Support Stand that is easy to use.
G) To provide a Plant Support Stand system that does not require the apparatus to be placed directly into the soil and thereby threaten the root system.

BRIEF DESCRIPTION OF THE DRAWINGS

FIG. 1 is a perspective view of a first plant stand.

FIG. 2 is a perspective showing the details of a locking device.

FIG. 3 is a perspective of an alternative anchoring means.

OPERATION

The present invention contains a flexible circular collar (22) that is flexible and pliable yet remains in a semi-rigid state (as a means to encircle a trunk or stem of a potted or planted plant or tree). Further containing a locking device consisting of a plurality of snap button holes (30) on one open end with a plurality of snap button knobs (34) located at the opposite open end. The flexible and pliable portion of the circular collar (22) is opened by means of removing the snap button knobs (34) from the snap button holes (30) the flexible circular collar (22) is then placed around the stem or trunk, thus encircling the potted or planted plant or tree. To secure the flexible circular collar (22) around the stem or trunk, place the plurality of snap button knobs (34) into the plurality of snap button holes (30). The plurality of slidable holding belts (36) are slid over the joined ends of the flexible circular collar (22).

The two piece adjustable elongated support member (26) is permanently joined to the flexible circular collar (22). The two piece adjustable elongated support member (26) extends downwards to the potted or planted plant or tree, wherein the lower forked elongated support member holder (38) is fitted into the upper lip portion of the plant pot. Additionally, for larger planted plants or trees, the two piece adjustable elongated support member (26) may contain a shovel head elongated support member base (40) as the means to be inserted directly into the soil an indeterminate distance outwards from the stem or trunk around a planted plant or tree.

The two piece adjustable elongated support member (26) consists of the top section, which includes the top elongated support member (28) containing the snap button hole (30) and the bottom elongated support member (32) which contains the snap button knobs (34) and the forked elongated support member holder (38).

The top elongated support member (28) is layed over the bottom elongated support member (32) with the snap button holes (30) inserted and snapped into the snap button knobs (34). The slidable holding belts (36) are then slid around the now joined, two piece adjustable elongated support member (26) firmly securing the top elongated support member (28) to the bottom elongated support member (32). The forked elongated support member holder (38) is then placed into the upper lip portion of the potted plant and is the means for the completed apparatus to support the potted plant or tree to stand erect.

In the event the Plant Support Stand is utilized in a planted plant or tree, the two piece adjustable elongated support member (26) is utilized in conjunction with a shovel head elongated support member base (40). The shovel head elongated support member base (40) is inserted directly into the soil outwards from the stem or trunk surrounding the planted plant or tree and is the means for the completed apparatus to support the planted plant or tree to stand erect.

Thus, as the circular collar (22) is inserted around a plant stem or tree trunk, the snap button knobs (34) are inserted into the snap button holes (30) securing the flexible circular collar (22) around the stem or tree trunk, with the plurality of two piece adjustable elongated support member (26) extending downward towards the potted plant pot or surface soil of a planted plant or tree. The two piece adjustable elongated support member (26) is then adjusted by means of moving the slidable holding belts (36) upwards and downwards to clear both ends of the top elongated support member (28) and bottom elongated support member (32). The snap button holes (30) are loosened from the snap button knobs (34) and the two piece adjustable elongated support member (26) are lengthened or shortened by sliding upwards or downwards to conform to the potted plant pot lip or the soil surface of a planted plant or tree. In the event the plant to be vertically supported is a potted plant, the forked elongated support member holders (38) are inserted into the upper lip of the potted plant pot. Conversely, if the Plant Support Stand is placed around a planted plant or a tree trunk, the shovel head elongated support members base (40) are inserted into the soil surrounding the plant or tree.

Thus, the reader will see that the Plant Support Stand provides a flexible, pliable, esthetically attractive, semi-rigid, reusable, highly reliable, lightweight, economical device, which can be utilized to support most plants or trees in a vertical manner.

While the above description contains many specifics, these should not be construed as limitations on the scope of the invention, but rather as an exemplification of one preferred embodiment thereof. I do not restrict myself to the details as shown or described herein, since many modifications can be made therein without departing from the essential features of my invention.

For example, the two piece adjustable elongated support member (26) can be a single one piece rigid elongated support member, not shown, thus eliminating the need for the slidable holding belts (36) as the means to secure the two piece adjustable elongated support members (26) together, while continuing to maintain the identical capabilities of sustaining a potted or planted plant or rooted tree in a vertical upright position.

Additionally, the single one piece rigid elongated support member, not shown, can be fitted with the forked elongated support member holder (38) or the shovel head elongated support member base (40) without detracting from the original concept of the invention.

PARTS LIST

22. Flexible circular collar
26. Two piece adjustable elongated support member
28. Top elongated support member with snap button hole
30. Snap button holes
32. Bottom elongated support member with snap button knobs
34. Snap button knobs
36. Slidable holding belts
38. Forked elongated support member holder
40. Shovel head elongated support member base

DESCRIPTION

FIG. (1), represents a flexible circular collar (22) indeterminate as to width, thickness or diameter, having the means for flexibility and pliability, further having the means to be opened or closed by means of the plurality of snap button knobs (34) and snap button holes (30) is permanently joined to a plurality of a two piece adjustable elongated support member (26). The plurality of two piece adjustable elongated support members represented by (26), are separated into a top elongated support member (28) containing a plurality of snap button holes (30) and a plurality of bottom elongated support member (32) containing a plurality of snap button knobs (34). Placed over and enveloping the outer portion of the plurality of two piece adjustable elongated support member (26) is a plurality of slidable holding belts (36) and is the means to hold the top elongated support member (28) to the bottom elongated support member (32) thus preventing the two piece adjustable elongated support member (26) from separating. As a means to join the plurality of two piece adjustable elongated support members (26) together, the plurality of top elongated support members (28) containing the plurality of snap button holes (30) are fitted to the plurality of bottom elongated support members (32) containing the plurality of snap button knobs (34) by means of inserting the plurality of snap button knobs (34) into the plurality of snap button holes (30). The slidable holding belts (36) are then slid over the two piece adjustable elongated support members (26). At the bottom of the bottom elongated support members (32) a forked elongated support member holder (38) is found, which is the means to hold the two piece adjustable elongated support members (26) to the potted plant pot.

FIG. (2), shows an isolated view of the two piece adjustable elongated support member (26). The plurality of two piece adjustable elongated support members, represented by (26) are separated into a top elongated support member (28) containing a plurality of snap button holes (30) and a plurality of bottom elongated support members (32) containing a plurality of snap button knobs (34) joined together by means of the snap button holes (30) being inserted into the snap button knobs (34) further having the means to be secured by the plurality of slidable holding belts (36) completely encircling the two piece adjustable elongated support member (26).

FIG. (3), depicts the modification for the device to become employed in holding a planted plant or tree vertically in the soil. The forked elongated support member holder (38) FIG. (1) is replaced with a shovel head elongated support member base (40), FIG. (3), and is the means to place the completed two piece adjustable elongated support member (26) depicted in FIGS. (1) and (2), into the soil an indeterminate distance from the base of the planted plant or tree trunk, by forcing or driving the shovel head elongated support member base (40) into the ground.

Having taken into account the detailed description thereof accompanied by the detailed drawings of my invention, I claim:

1. A plant support stand for maintaining a plant or tree in a verticle position comprising:

(a) a circular semi-rigid collar having two ends and a first detent means for locking said ends in a plurality of different overlapping positions;

(b) a plurality of elongated support members each having an upper and lower ends and being secured in supporting relationship to said collar at said upper end thereof and comprised of two pieces having lapping ends which may be separated and reattached via a second detent means to adjust said support stand to differing heights for accommodating plants or trees of differing sizes;

(c) each of said elongated support members being provided with an anchoring means at said lower end; and (d) a plurality of slidable straps, at least one strap for said semi-rigid collar and at least one strap for each leg whereby the ends of said collar and the lapping ends of each of said support members may be positioned by said detent members and then locked in place by said sliding straps.

2. A plant support stand as in claim 1 wherein said anchoring means is a point capable of being imbedded in the ground to anchor each of said support members at the lower end.

3. A plant support stand as in claim 1 adapted for use on a flower pot having an upper edge wherein said anchoring means is a fork capable of engaging the upper edge of said flower pot.

* * * * *